Jan. 4, 1927.  
E. M. SYMMES  
1,613,334  
GRANULAR AMMONIUM NITRATE AND PROCESS OF MAKING SAME  
Filed Nov. 8, 1924
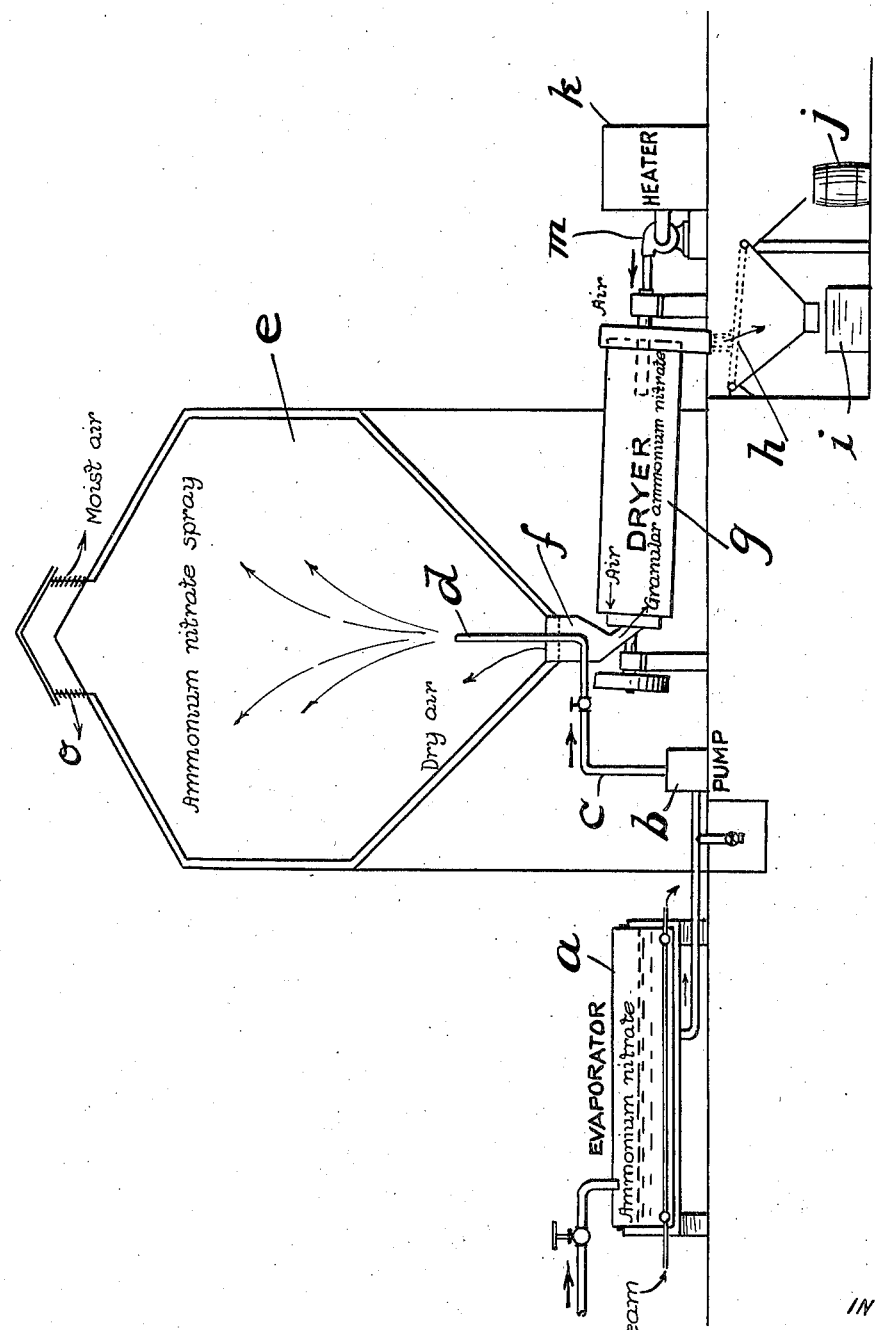
WITNESS:
INVENTOR  
Ernest M. Symmes  
BY Busser and Harding  
ATTORNEYS.

Patented Jan. 4, 1927.

1,613,334

UNITED STATES PATENT OFFICE.

ERNEST M. SYMMES, OF WILMINGTON, DELAWARE, ASSIGNOR TO HERCULES POWDER COMPANY, OF WILMINGTON, DELAWARE, A CORPORATION OF DELAWARE.

GRANULAR AMMONIUM NITRATE AND PROCESS OF MAKING SAME.

Application filed November 8, 1924. Serial No. 748,548.

In the process of preparing granular ammonium nitrate, the principal use of which is as an ingredient of explosives, it is customary to prepare weak solutions of the salt and evaporate the solution to a certain concentration at a certain temperature, after which the solution is discharged into a graining kettle and slowly crystallized with agitation and cooling at a certain rate. The rate of crystallization and concentration of the evaporated solution controls the fineness of the product. Slow crystallization of a highly concentrated solution produces coarse particles in the form of irregular botryoidal solid crystals. Crystallizing at an increased rate results in relatively fine particles, which are also in the form of solid crystals.

Granular ammonium nitrate produced by this process is composed of solid grains, has greater density and hygroscopicity than is desirable, and when passing through the transition point at 32° C. (89.6° F.), there is considerable external expansion.

The process forming the subject-matter of this application involves a substantially different method of treating the evaporated solution and effects a substantial saving in the cost of manufacture. The resultant product has essential advantages, as compared with the ordinary granular ammonium nitrate which may be enumerated as follows: (1) It has a lower density, thereby allowing a higher cartridge count when the salt is used as an ingredient of explosives. (2) Explosives containing the improved ammonium nitrate have a higher sensitiveness. (3) The improved ammonium nitrate has lower hygroscopicity. (4) When passing through the transition point at 32° C. (89.6° F.), there is substantially less external expansion. The external expansion of ordinary ammonium nitrate constitutes a serious objection to explosives containing ammonium nitrate in substantial proportion, as this causes the explosive to set (harden), so that it becomes relatively insensitive and may not detonate properly. The reduced setting tendency of the improved product is a quality of much importance.

The improved product is distinguished by certain physical characteristics from the ammonium nitrate that is made in the ordinary way, in that it comprises a large number of substantially spherical globules having a hollow interior. The advantages hereinbefore enumerated are due, in whole or in part, to the physical character of the ammonium nitrate granules. Such hollow spherical particles cannot be manufactured by the process in general use, namely, the crystallization in graining kettles with agitation and cooling.

The process hereinafter described, which constitutes the preferred way of making the improved product, comprises the projection of an evaporated solution of ammonium nitrate, or molten ammonium nitrate, through a nozzle or atomizer, at a substantially definite pressure, into a gaseous cooling medium. An apparatus adapted to carry out the process is shown in the accompanying drawing, which is a longitudinal sectional view of such apparatus.

It should be understood, however, that no novelty is claimed for any element of the apparatus and that the process is not dependent for its execution upon the employment of the apparatus illustrated or of any other particular apparatus.

A weak neutral ammonium nitrate liquor is concentrated in the evaporator $a$. From the evaporator the more or less concentrated solution, by means of a pump $b$, is conveyed through a steam-jacketed pipe $c$ and discharged through a nozzle $d$ into the spray chamber $e$ under sufficient pressure to effect the atomization of the solution. It should be understood that the term "atomization" is used in its popular sense to imply a division of the solution into a number of very fine particles, which will solidify before they have traversed the height of the spray chamber. The spray chamber is of substantial dimensions and is provided with a sloping bottom communicating with a hopper $f$, which discharges the material into a rotating drying chamber $g$. From the drying cylinder the dried material is discharged, say, onto a screen $h$; the grains which it is desired to utilize as an explosive ingredient passing through the screen into a receiver $i$, while the tailings pass over into a separate receiver $j$. By means of a heater $k$ and a blower $m$, a current of hot air or other gas is forced through the drier, the air thence escaping through the hopper $f$ into the spray chamber $e$.

The character of the material produced by the improved process is controlled by the conditions under which the process is carried out. It has been found that the density of the material varies in a substantially direct ratio to the freezing point of the solution sprayed and in a substantially inverse ratio to the temperature of the solution and degree of atomization. In other words, the density of the product resulting from spraying a solution having a freezing point only slightly below the temperature of the solution when sprayed will be higher than that of the product from a solution having the same freezing point but sprayed at a higher temperature. By controlling the freezing point and temperature of the solution and the degree of atomization, the character of the product may be controlled. The freezing point of the solution varies with the degree of concentration. The degree of atomization may be varied by varying the pressure at the nozzle and to some extent by varying the temperature of the solution when sprayed.

As an illustration of the process, a weak solution of ammonium nitrate is concentrated in the evaporator *a* to a point where the solution has a temperature of 310° F. and at which the ammonium nitrate if taken out would freeze or crystallize at 280° F. With a steam pressure of fifty pounds to the square inch on the jacketed feed pipe *c*, the solution is delivered through the pump to the nozzle *d* at a pressure of twenty pounds to the square inch. The heated air in chamber *f* may be at any desired temperature (say 100° F. to 150° F.) and is substantially devoid of moisture. This air, however, is very cold relatively to the incoming spray of ammonium nitrate, and almost immediately cools the sprayed particles to the point of solidification. It will be understood that there is a continuous current of dry air flowing into the bottom of chamber *e* and out the ventilators *o* at the top thereof.

The ammonium nitrate is projected in the form of a vast number of particles of spherical form. From contact with the cooling gaseous medium filling the spray chamber, these spheres quickly form an exterior solidified shell. The interior of each particle freezes more slowly and, due to the contraction that takes place on cooling, a void space is left in the interior. The product has an apparent density of about .70 and a fineness (with the freezing point, temperature and degree of atomization specified as an example) such that ninety-five per cent will pass through a ten mesh screen and be held on a forty mesh screen. By increasing the atomizing action, finer particles are produced. For example, the degree of fineness may be such that not more than five per cent will be held on a forty mesh screen, while five per cent or more will pass through a hundred mesh screen. Whatever the degree of fineness, the grains have a spherical form with an interior void space. Besides being much less dense than granular ammonium nitrate produced by the ordinary method, they are less hygroscopic and show less increase in volume when passing through the 32° C. transition point.

The size and density of the material are both affected by, and may be controlled by regulating, the freezing point, temperature and degree of atomization of the liquid when sprayed. In all cases, however, the density will be low as compared with the ordinary product and there will be a close approximation to uniformity in size. The density can be easily varied from .6 to .9.

The spraying of substances in a liquid condition into a space within which they are acted on by a gaseous medium and are converted to the form of fine solid particles has been effected in apparati of various constructions. Certain of such apparati may be adapted to the execution of the present process, which, as hereinbefore stated, is not dependent on the use of any particular apparatus nor on an apparatus which necessarily embodies any patentably novel features.

While the weak solution is described as being concentrated to a point where the solution has a temperature of 310° F., crystallizing at 280° F., it is contemplated that these temperatures shall be subject to variation, dependent on the character or quality that it is desired to impart to the ultimate product. It is impracticable, however, to carry the temperature of evaporation or crystallization much higher than 310° F., as decomposition occurs in the neighborhood of 320° F. The lowest practicable crystallizing temperature would be 250° F. or higher. The temperature of the gas entering the spray chamber is immaterial so long as it is substantially below the temperature of the liquid as it is being atomized. The gas should, of course, be nearly free from moisture. All required conditions can be satisfied by using air as the gaseous cooling medium and heating it to above 100° F. and below 150° F.

Examples of explosives in which the improved ammonium nitrate may be advantageously employed are as follows:

An ammonia permissible explosible having the following typical composition:

| | Per cent. |
|---|---|
| Nitroglycerin, nitropolyglycerin, nitrosugar, nitroglycol, or any other similar liquid explosive | 10 |
| Carbonaceous material | 10 |
| Ammonium nitrate | 80 |

Ammonia dynamite (the example given being a low freezing dynamite of so-called 40% strength):

| | Per cent. |
|---|---|
| Any of the above specified liquid explosives | 17 |
| Nitroaromatic compounds | 3 |
| Sodium nitrate | 41 |
| Carbonaceous material | 11 |
| Ammonium nitrate | 28 |

Ammonia gelatin (the example given being low freezing):

| | Per cent. |
|---|---|
| Any of the above specified liquid explosives | 29 |
| Nitrocotton | 0.6 |
| Sodium nitrate | 46.4 |
| Sulphur | 3.0 |
| Carbonaceous material | 15.0 |
| Ammonium nitrate | 6.0 |

Where, in the claims, I use the term "concentrated fluid ammonium nitrate" I mean to include any solution of ammonium nitrate that is not so highly concentrated that it will not flow and that is sufficiently concentrated to enable the particles thereof that are sprayed into the spray chamber to quickly solidify under the influence of a gaseous cooling medium. The temperature of such a solution is necessarily above 240° or 250° F. and preferably not far from 310° F. and much above the temperature of air that is heated only to the degree required to substantially eliminate moisture therefrom.

I have not herein claimed an explosive comprising my improved ammonium nitrate, as the same forms the subject-matter of a separate application, filed November 8, 1924, Serial No. 748,549.

Having now fully described my invention, what I claim and desire to protect by Letters Patent is:

1. The process of making granular ammonium nitrate which comprises conveying ammonium nitrate having a temperature above 240° F. and below 320° F. to, and spraying it into, a gaseous cooling medium, thereby suddenly cooling the ammonium nitrate and converting it into granules having an internal void space.

2. The process of making granular ammonium nitrate which comprises concentrating by evaporation a relatively weak solution of ammonium nitrate to a temperature below 320° F. and above 250° F. and spraying the concentrated solution into a gaseous medium whose temperature is below 150° F.

3. The process of making granular ammonium nitrate which comprises continuously projecting a spraying of concentrated fluid ammonium nitrate into a gaseous cooling medium, thereby effecting a sudden cooling with consequent solidification of the particles, continuously conveying the particles away from the locus of spraying and solidification, subjecting the particles, while being so conveyed, to the action of a flowing current of dry gas, and conveying such gas to the locus of spraying and solidification, where it functions as the gaseous cooling medium above specified.

4. A low density ammonium nitrate comprising granules each having an internal void space.

5. Ammonium nitrate in granular form, the grains being substantially spherical with internal cavities.

6. Ammonium nitrate in the form of substantially spherical hollow grains and having a density between .6 and .9.

In testimony of which invention, I have hereunto set my hand, at Wilmington, Del., on this 5th day of November, 1924.

ERNEST M. SYMMES.